June 23, 1925.
G. F. WEATON
APPARATUS FOR CONTINUOUSLY INDICATING AND CONTROLLING THE DEGREE OF CONCENTRATION OF LIQUIDS IN EVAPORATING VESSELS
Original Filed Feb. 13, 1922
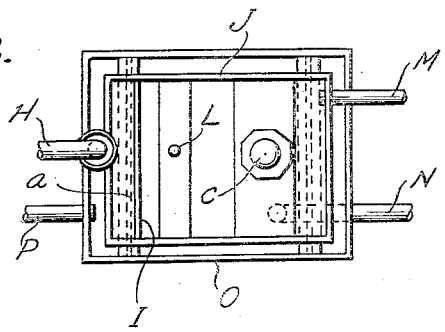
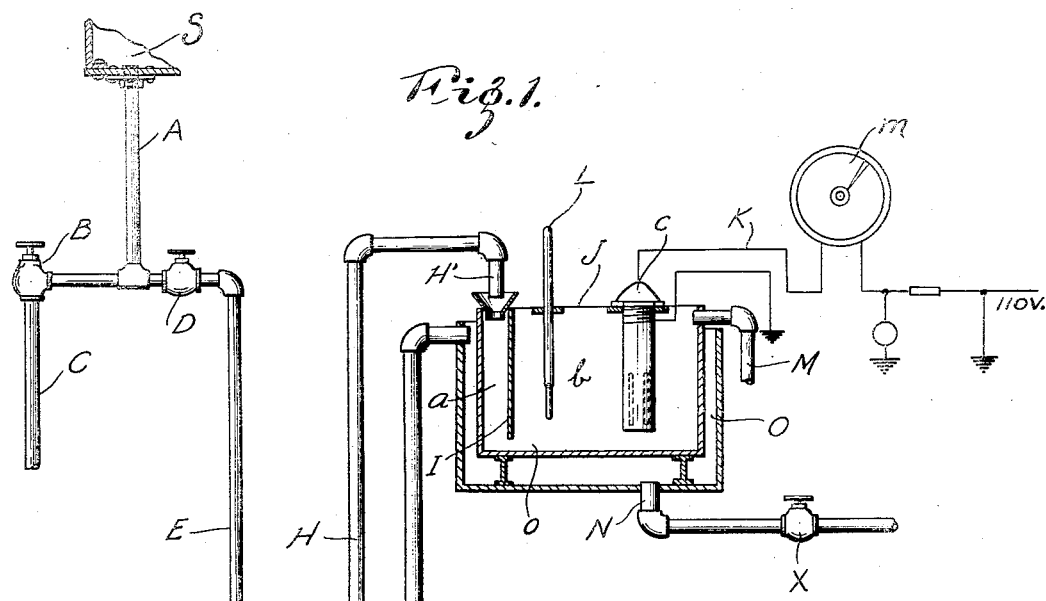
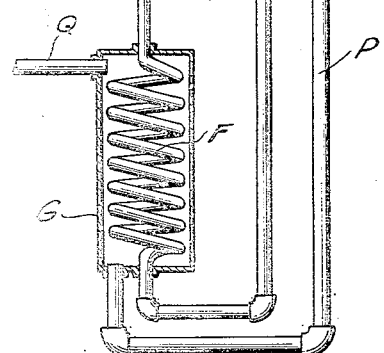
INVENTOR:-
George Frederic Weaton
By Harry A. Beimes
ATTORNEY.

Patented June 23, 1925.

1,543,137

UNITED STATES PATENT OFFICE.

GEORGE FREDERIC WEATON, OF RIVERMINES, MISSOURI.

APPARATUS FOR CONTINUOUSLY INDICATING AND CONTROLLING THE DEGREE OF CONCENTRATION OF LIQUIDS IN EVAPORATING VESSELS.

Original application filed February 13, 1922, Serial No. 536,284. Divided and this application filed March 26, 1923. Serial No. 627,809.

*To all whom it may concern:*

Be it known that I, GEORGE FREDERIC WEATON, a citizen of the United States, residing at Rivermines, in the county of St. Francois and State of Missouri, have invented certain new and useful Improvements in apparatus for continuously indicating and controlling the degree of concentration of liquids in evaporating vessels, of which the following is a specification.

My invention has relation to improvements in apparatus for continuously indicating and controlling the degree of concentration of liquids in evaporating vessels, such as steam boilers and continuous stills, as well as other types of evaporators, and consists in the novel features more fully set forth in the specification and pointed out in the claim. This application is divided out of my copending application Serial No. 536,284, filed Feb. 13, 1922, which was directed to both the process and apparatus.

It is a well known fact that evaporators, such as steam boilers, which are fed from the available water supply must be "blown down" from time to time in order to discharge impurities that have precipitated from the liquid after the same has reached a high degree of concentration, or this blowing down may be resorted to in time to prevent excessive precipitation and consequent priming of the vessel. However, this blowing down as now practiced is a hit or miss method being resorted to when, in the judgment of the engineer, it is necessary, or when signs of priming make it necessary. And, then, the amount of blowing down is left to guess-work, often resulting in excessive blowing down and waste of heat and water.

In order to overcome the evils just pointed out, I have evolved the present apparatus for scientific "blowing down" based on the fact that the degree of concentration of solids in solution and suspension can be held constant at a predetermined point.

Among the advantages of my invention are the following:

The continuous removal of concentrated solids in solution from that place within the evaporating vessel where the concentration will be maximum.

The continuous removal of solids in suspension.

Continuously indicating the degree of concentration of the liquid, this indication being, for all practical purposes instantaneous.

The continuous "blowing down" permits the partial or entire recovery of the heat usually wasted for heating the feed to the evaporating vessel, or for other purposes. This heat may amount to as much as one per cent of the total heat absorbed by the evaporating vessel's contents.

There is no time when concentration will reach a point where excessive precipitation will occur since the amount of solids deposited in the evaporating vessel is reduced and the evil result of priming, such as deposits of solids in super-heaters and valves about the plant, the deposit of solids on the blading of steam turbines and their valves are all eliminated so far as the concentration of solids in solution or suspension may be responsible for the priming of these vessels.

The manner of accomplishing these objects as well as other advantages will be better apparent from a detailed description of the invention in connection with the accompanying diagrammatic drawing of the apparatus.

Referring to the drawing, S represents that part of an evaporating vessel from which the liquid is drawn (preferably where the degree of concentration is maximum). A pipe A, or other suitable conductor, is connected to the part S of the evaporating vessel, and the concentrated liquid is permitted to flow continuously to a control valve B which is operated at will to regulate the flow of the liquid to any rate required to maintain the predetermined concentration within the evaporating vessel, it being understood that the evaporating vessel is constantly receiving a fresh supply of water from the feed pump (not shown) the operation of which is well understood in the art. A pipe C takes care of the discharge from valve B, which discharge may be conducted to any desired point for recovery or, if desired, may be wasted.

Now, it is the object of the present invention to continuously control the degree of concentration of the liquid in the evaporator S, consequently the concentration must be determined and the valve B regulated accordingly. For this purpose a branch pipe E is connected to pipe A through which a small quantity of the concentrated liquid is permitted to flow by regulating the sampling valve D. Owing to the fact that no satisfactory method has ever been developed for measuring the concentration of a liquid at high temperatures it is necessary for a proper determination of this concentration to reduce the temperature to a point where the liquid can be handled at atmospheric pressure and where density meters will indicate concentration because practically all hydrometers and electro-conductivity indicators are calibrated in terms of concentration of sodium chloride (NaCl) at 60° F. The reduction of the temperature of the concentrated liquid is brought about by conducting the liquid through conductor E to a condenser or cooler F which cools the liquid to any desired temperature suitable to the range of the density meter employed. After passing through the cooler F the liquid flows through a pipe H, the discharge neck H' of which terminates a suitable distance above a tank J into which the liquid discharges. The tank J is divided into two compartments $a$ and $b$ by a partition I which terminates a short distance above the bottom of the tank J so that after the liquid falls into compartment $a$ it will be forced to circulate through the opening $o$ below partition I into compartment $b$ and thus be completely diffused throughout the tank J. By elevating the discharge H' above the tank J the rate of flow of the amount of liquid being sampled can be observed. In order to maintain a constant level of liquid in tank J an overflow trough M is provided at the end opposite the intake end of said tank from which the liquid discharges into cooling tank O, or conducted away as desired.

A pipe N is connected to tank O at the bottom, through which cold water is admitted to said tank, the rate of flow being controlled by a valve X to regulate the cooling effect on the concentrated liquid in tank J. The cooling water discharges from the tank O near the top thereof through a pipe P which conducts said water to the cooler shell G from which it discharges through a pipe Q.

The temperature of the concentrated liquid is thus reduced by coolers F and O, the regulating valve X being used to regulate the degree of temperature reduction, to a normal temperature where the concentration of the liquid may be measured; and the concentration of the liquid in the tank J may be termed the "normal temperature concentration". This normal temperature concentration of the liquid is the same as the concentration at the evaporator temperature when referred to weight, and after the danger point of concentration in the particular evaporator being used is determined it is a simple matter to control this concentration operating the apparatus with a reasonable margin of safety between the dangerous concentration as indicated and that actually allowed.

For indicating this concentration in the tank J, I may use an electrolytic conductivity meter or recorder K, or a hydrometer, said recorder comprising a conductivity cell $c$ and meter $m$, the normal temperature range for a correct scale reading being maintained by the aid of a thermometer L or thermo-couple. As the meter K indicates a density of the liquid above that allowable, the valve B is opened, permitting an increased amount of concentrated liquid to discharge from the evaporator S until the allowable density of the liquid is restored, when the valve B may be closed to again lessen the amount of liquid discharged. In this way the liquid in the evaporator is constantly maintained within the limits of a predetermined range of concentration.

From the foregoing it will be readily apparent that the apparatus whereby the temperature of the liquid is reduced is simple and reliable and permits of a direct reading or recording of the degree of concentration in addition to permitting samples to be taken directly from the box J, when desired for chemical analysis by titration.

Furthermore the controlling of the liquid concentration between safe limits permits of a more nearly continuous operation of the evaporators and other power-plant apparatus, and the rate of blowing down of the evaporating vessel by means of the above novel and useful system may be varied directly and accurately as the rate of evaporation and consequent rate of concentration is increased.

Obviously the valves B, indicating tanks J and other parts of the apparatus, may be connected in parallel to serve multiple evaporating units, and other changes may be made by one skilled in the art without departing from the spirit of the invention.

Having described my invention, I claim:

In an apparatus of the class described, in combination with an evaporating vessel provided with a valve controlled discharge conduit, means for conducting from the evaporator a sample of the fluid therein, a cooler, means for conducting said sample to the cooler, a receiving tank, means for conducting the cooled liquid to the receiving tank, means for circulating a cooling medium through the receiving tank and cooler, and means for measuring the temperature and the density of the liquid within the tank.

In testimony whereof I hereunto affix my signature.

GEORGE FREDERIC WEATON.